March 18, 1952 — W. O. SMITH — 2,589,580
SHRIMP DISTRIBUTING MACHINE
Filed Dec. 12, 1947 — 2 SHEETS—SHEET 1
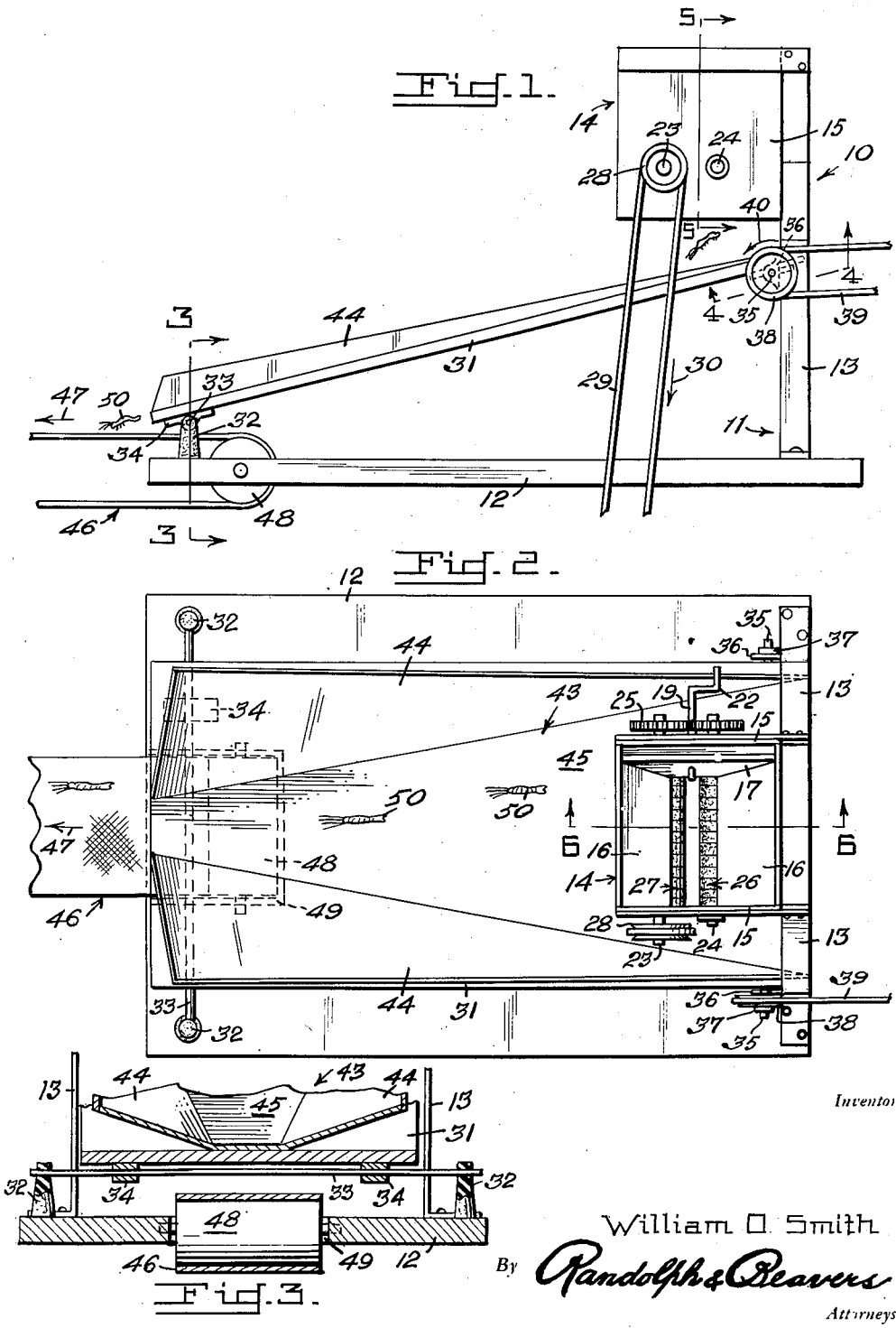
Inventor
William O. Smith
By Randolph & Beavers
Attorneys

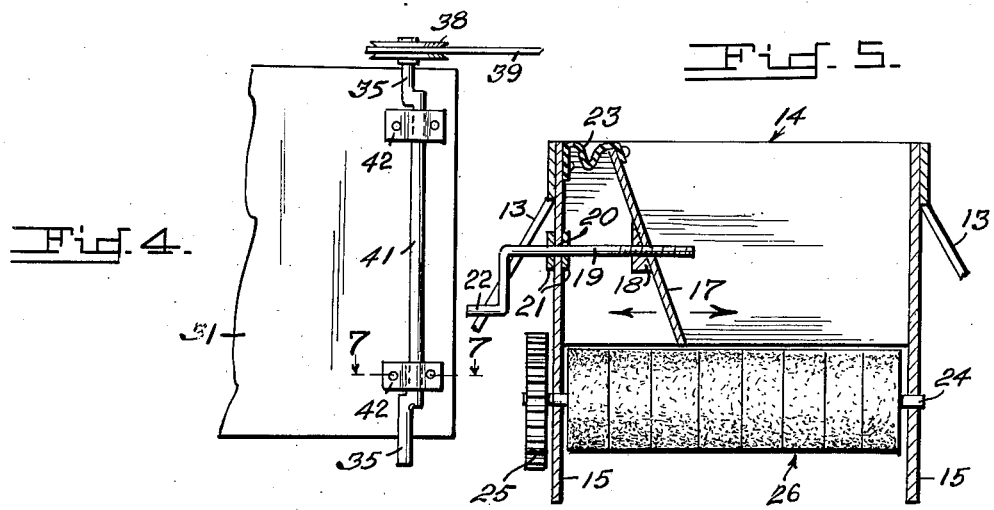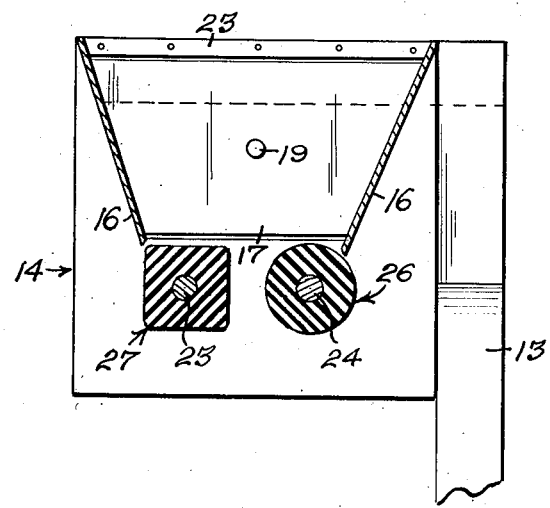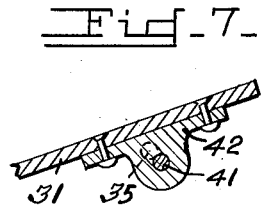

Patented Mar. 18, 1952

2,589,580

UNITED STATES PATENT OFFICE 2,589,580

SHRIMP DISTRIBUTING MACHINE

William O. Smith, Freeport, Tex., assignor of thirty-three per cent to E. R. Bennett, Brazoria County, Tex.

Application December 12, 1947, Serial No. 791,181

2 Claims. (Cl. 198—53)

This invention relates to a machine for feeding and distributing shrimp headfirst to an endless conveyer and has particular reference to a machine for accomplishing the aforedescribed functions without bruising or damaging the shrimp.

More particularly, it is an object of the present invention to provide a machine including an adjustable hopper having agitating and dispensing means from which the shrimp are discharged and whereby the shrimp are received therefrom on a gravity and vibratory conveyer over which the shrimp are conveyed and discharged headforemost onto a further conveyer for the shrimp.

A further object of the invention is to provide a novel hopper from which the shrimp may be discharged singularly while being subjected to feeding and agitating means so constructed that the shrimp will not be bruised or damaged thereby.

A still further object of the invention is to provide an inclined table over which the shrimp are conveyed from the hopper by a novel vibratory action for causing the heavy or headed ends of the shrimp to assume foremost positions whereby the shrimp will be properly positioned for subsequent feeding to a shrimp deheader or other machine.

Various other objects and advantages of the invention will hereinafter become more fully apparent from the following description of the drawings, illustrating a presently preferred embodiment thereof, and wherein:

Figure 1 is a side elevational view of the shrimp distributing machine;

Figure 2 is a top plan view thereof;

Figure 3 is a cross sectional view taken substantially along a plane as indicated by the line 3—3 of Figure 1;

Figure 4 is a fragmentary bottom plan view of a portion of the machine taken substantially along a plane as indicated by the line 4—4 of Figure 1;

Figure 5 is a vertical sectional view of another portion thereof taken substantially along a plane as indicated by the line 5—5 of Figure 1;

Figure 6 is a vertical sectional view taken substantially along a plane as indicated by the line 6—6 of Figure 2;

Figure 7 is a sectional view taken substantially along a plane as indicated by the line 7—7 of Figure 4, and Figure 8 is a perspective view of one element of the machine.

Referring more specifically to the drawings, a shrimp distributing machine, designated generally 10 and comprising the invention, includes a frame, designated generally 11 having an elongated base 12 which is provided adjacent one end thereof with upwardly extending, upwardly converging supporting standards or posts 13 which are disposed in transversely spaced relationship to one another and to the upper, adjacently disposed ends of which is secured a hopper, designated generally 14.

As best seen in Figures 2, 5 and 6, the hopper 14 includes substantially upright end walls 15 and downwardly and inwardly converging side walls 16 the lower, adjacent ends of which terminate substantially above the bottom edges of the end walls 15, as clearly illustrated in Figure 6. As seen in Figure 5, a false end wall 17 is disposed adjacent one of the end walls 15 and is inclined inwardly and downwardly and is provided with downwardly tapered side edges to fit between the side walls 16 and terminate at approximately the level of said side walls. The false end wall 17 is provided with a threaded boss 18 to receive a feed screw 19 therein having an unthreaded outer portion which extends rotatably through an opening 20 in the end wall 15, disposed adjacent to said false end wall 17. The feed screw 19 carries collars 21 which are adjustably secured thereto on opposite sides of said end wall 15 to prevent the feed screw from sliding relatively thereto. The feed screw 19 is provided at its outer end and externally of the hopper 14 with a crank 22 by means of which it can be manually rotated for moving the false end wall 17 toward or away from the end wall 15 through which the feed screw 19 extends. An elastic strip of suitable material 23 is fastened at one edge thereof to the upper end of the false end wall 17 and has its opposite edge fastened to the adjacent end wall 15 for closing the space therebetween at the top of the hopper and it will be readily apparent that the false end wall 17 can be adjusted toward or away from the end wall 15, located remote thereto, for varying the size of the hopper container and combines with said last mentioned end wall 15 and the side walls 16 to define a restricted open bottom or outlet of the hopper 14, the size of which is varied by adjustment of the false end wall 17.

A pair of shafts 23 and 24 extend through the hopper 14, beneath and longitudinally of the side walls 16 and are journaled therein in the end walls 15 and are provided on corresponding ends thereof and externally of the hopper 14 with meshing gears or pinions 25 whereby said shafts 23 and 24 will rotate as a unit in opposite directions. The shaft 24 carries a roller 26 of circular cross section and which preferably comprises a plurality of disk-shaped sections, as best illustrated in Figure 5, the bore of each of which is suitably secured to the shaft 24 for rotation therewith and whereby said individual disk-shaped sections may yield individually. The shaft 23 carries a roller 27, likewise preferably formed of sponge rubber and also formed of a plurality of sections but which is of substantially square cross section, as seen in Figure 6. The rollers 26 and 27 are disposed adjacent the open bottom of the hopper formed by the side walls 16, false end wall 17 and the end wall 15, located remote thereto, and are spaced laterally from one another to provide an opening or outlet therebetween through which the shrimp are adapted to be discharged by gravity. As seen in Figure 1, a pulley or sheave 28 is keyed to the opposite end of the shaft 23 and is driven by an endless belt 29 connected to a suitable power source, not shown, in the direction as indicated by the arrow 30 so that the roller 27 will turn clockwise and the roller 26 counterclockwise, as seen in Figure 6 for discharging the shrimp through the space therebetween.

A substantially flat vibratory table 31 is supported by the frame 11 below the level of the hopper 14. As best seen in Figure 3, a pair of resilient standards 32 are secured to and rise from the frame base 12 adjacent the end thereof, remote to the posts 13 and are disposed in laterally spaced relationship to support a rod or shaft 33 the ends of which are connected to the upper portions of said resilient standards 32. The table 31 is provided on its underside and adjacent one end thereof with bearings 34 engaging the shaft 33 for pivotally supporting said table thereon for vertical rocking movement toward and away from the base 12. The table 31 extends upwardly at an incline from the shaft 33 toward the posts 13 and is supported adjacent its opposite, upper end by means of a shaft 35 the end portions of which are journaled in bearings 36 which may be secured to the posts 13 and which is held against sliding movement therein by adjustable collars 37. A sheave or pulley 38 is keyed to the shaft 35 adjacent one end thereof and has an endless belt 39 trained thereover and driven from a suitable power source, not shown, in the direction as indicated by the arrow 40 in Figure 1 for revolving the shaft 35 in its gearings 36. The shaft 35 is provided with an intermediate crank portion 41, as best illustrated in Figures 4 and 8 which is disposed beneath a portion of the upper end of the table 31 and which is connected thereto by bearings 42 secured to the underside of said table and in which the crank portion 41 is journaled.

The upper surface of the table 31 is substantially covered by a plate, designated generally 43 and preferably formed of metal the side edge portions of which as indicated at 44 are flared upwardly. Said flared or guide portions 44 converge with their inner edges toward one another from the upper toward the lower end of the plate 43 to form an intermediate surface 45 which tapers in width toward the lower end of the table 31 and the upper, wider end of which is disposed beneath the open bottom of the hopper 14.

The lower restricted end of the chute portion or surface 45 opens over a portion of the upper flight of a driven endless conveyer 46 the upper flight of which moves in the direction as indicated by the arrow 47 in Figure 2 and one end of which conveyer is trained over a drum or pulley 48 which is rotatably supported by the frame base 12 and in a recess 49 thereof.

From the foregoing it will be readily apparent that the hopper 14 is adapted to be filled in any suitable manner with shrimp and by adjustably positioning the false end wall 17 the size of the hopper may be varied as well as the discharge opening thereof for varying the rate at which the shrimp will be discharged from the hopper. The shafts 23 and 24 are revolved in opposite directions by the meshing gears 25 when the driven belt 29 is in operation for causing the shrimp to be discharged through the space between said rollers 26 and 27 and the square roller 27 will constantly agitate the shrimp due to the fact that said rollers constitute the hopper bottom and the rectangular cross sectional shape of the roller 27 will produce a violent agitation of the shrimp as the two rollers are revolved. The yieldability of the sponge rubber rollers and the capacity of the individual sections thereof to yield individually will prevent the shrimp from being bruised or otherwise damaged. The shrimp are discharged from the hopper 14 onto the upper, wide portion of the chute surface 43 of the vibratory table 31. The shaft 35 is driven by the driven belt 39 and due to the journaling of its eccentric or crank portion 41 in the bearings 42, the upper end of the vibratory table 31 is oscillated vertically or toward and away from the hopper 14 on the shaft 33 as a pivot. Due to the fact that the bearings 42 are secured fast to the table 31, said table is also vibrated in a direction generally longitudinally of the frame 11, this movement thereof being accommodated by the resilient posts 32 which support the lower end of the table and as the shaft 35 is revolved at a high rate of speed it will be readily apparent that the oscillatory and reciprocatory vibration of the table 31 will be very rapid so as to cause the shrimp, as indicated at 50 in Figure 2 to move downwardly along the chute portion 45 and to be guided toward the central portion of the table by the inclined side portions 44 so as to be discharged onto the upper flight of the endless conveyer 46. The heads of the shrimp 50 constitute the heavy ends thereof so that said shrimp will turn in their movement downwardly along the chute surface 45 until they are moving headfirst and they will thus be discharged onto the conveyer 46 which may extend to any suitable means for handling the shrimp such as a deheading machine as disclosed in my prior copending application Serial No. 752,902, filed June 6, 1947, and now Patent No. 2,491,778 granted December 20, 1949, and entitled Machine for deheading shrimp.

Various modifications and changes are contemplated and may obviously be resorted to, without departing from the spirit or scope of the invention as hereinafter defined by the appended claims.

I claim as my invention:

1. In a shrimp distributing machine, an upright hopper adapted to contain shrimp to be dispensed therefrom, and rotary driven dispensing and agitating means disposed in a horizontal plane and forming the hopper bottom and comprising a pair of rollers driven in opposite directions and disposed in spaced, substantially parallel relationship to define a discharge opening therebetween constituting the hopper outlet, said rollers being formed of yieldable material, and at least one of said rollers including a plurality of separate sections disposed for individual yielding movement.

2. In a shrimp distributing machine, an upright hopper adapted to contain shrimp to be dispensed therefrom, and rotary driven dispensing and agitating means disposed in a horizontal plane and forming the hopper bottom and comprising a pair of rollers driven in opposite directions and disposed in spaced, substantially parallel relationship to define a discharge opening therebetween, said rollers being formed of yieldable material, each of said rollers including a plurality of separate sections disposed for individual yielding movement.

WILLIAM O. SMITH.

REFERENCES CITED

The following references are of record in the file of this patent:

UNITED STATES PATENTS

| Number | Name | Date |
|---|---|---|
| 269,850 | Hadden | Jan. 2, 1883 |
| 614,314 | Wright | Nov. 15, 1898 |
| 1,032,132 | Gormley | July 9, 1912 |
| 1,278,463 | Heim | Sept. 10, 1918 |
| 1,488,707 | Parrish et al. | Apr. 1, 1924 |
| 2,103,387 | Salfisberg | Dec. 28, 1937 |
| 2,356,961 | Weyandt | Aug. 29, 1944 |

FOREIGN PATENTS

| Number | Country | Date |
|---|---|---|
| 11,155 | Great Britain | Apr. 23, 1914 |